July 2, 1940.    C. G. TRIMBACH ET AL    2,206,065
FLEXIBLE GUN TURRET
Filed Nov. 3, 1937    7 Sheets-Sheet 2

INVENTORS
CLEM G. TRIMBACH and
CAMILLE R. LEMONIER
ATTORNEY

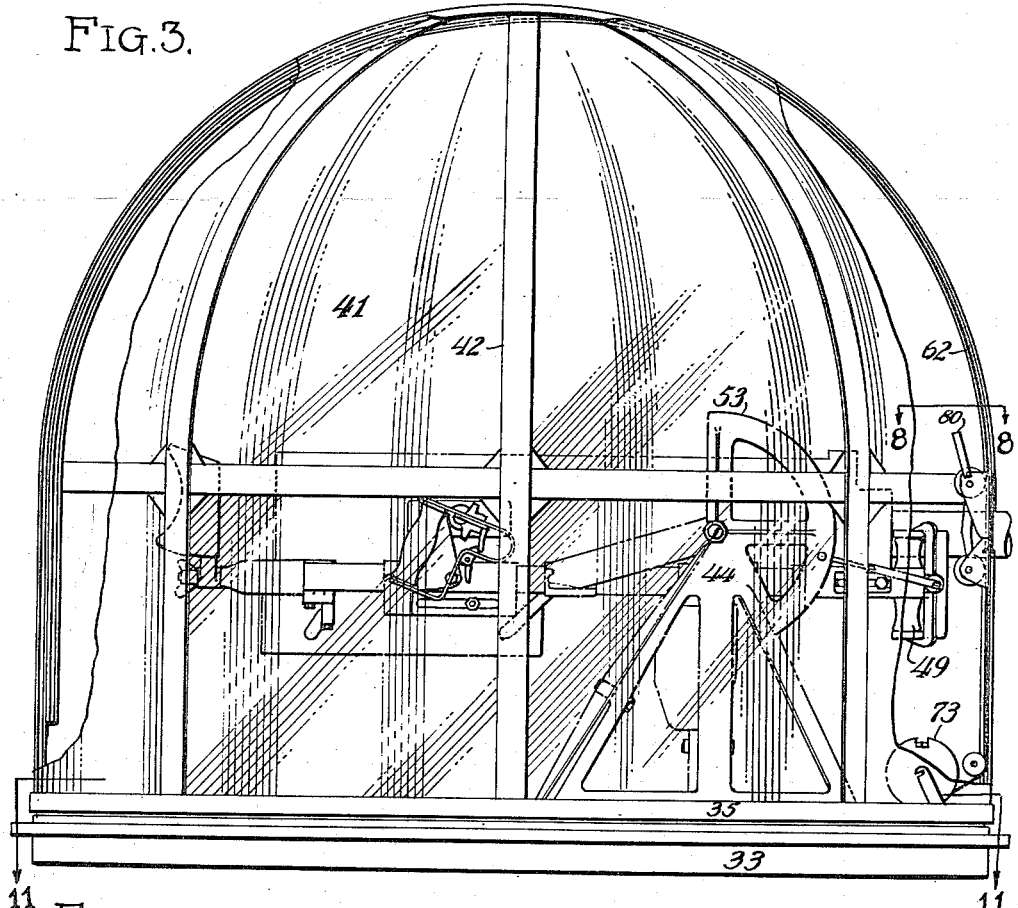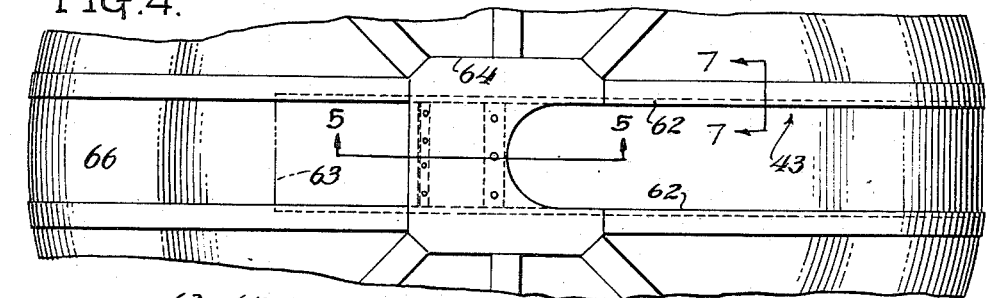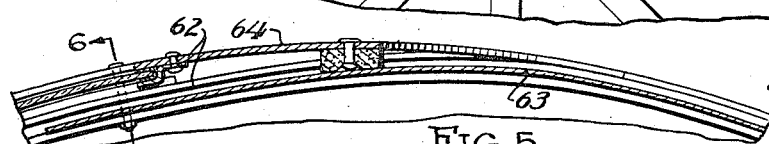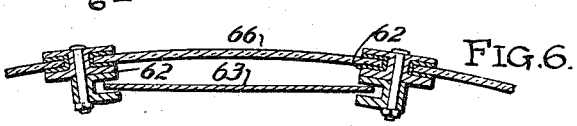

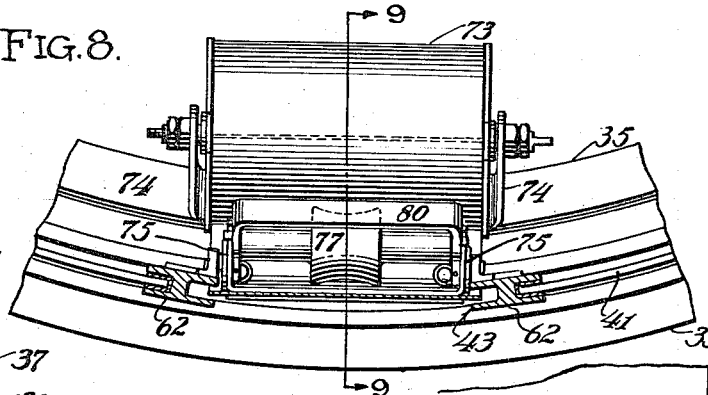
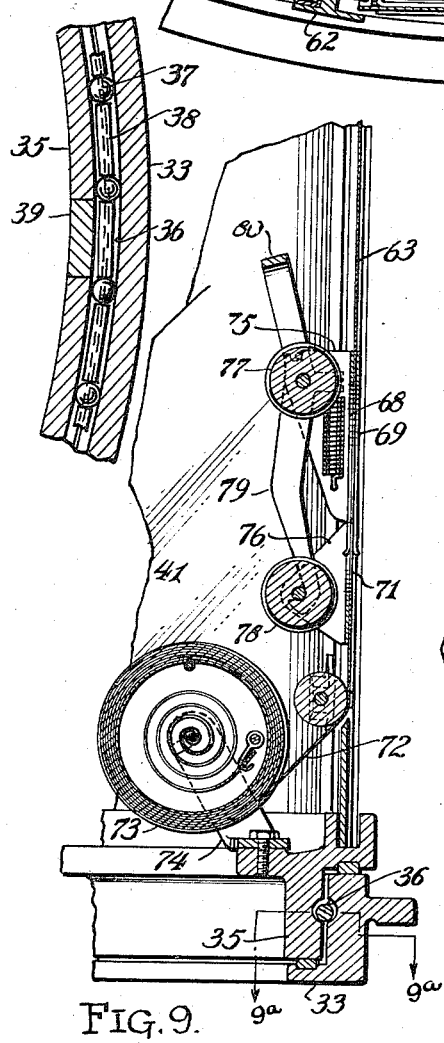
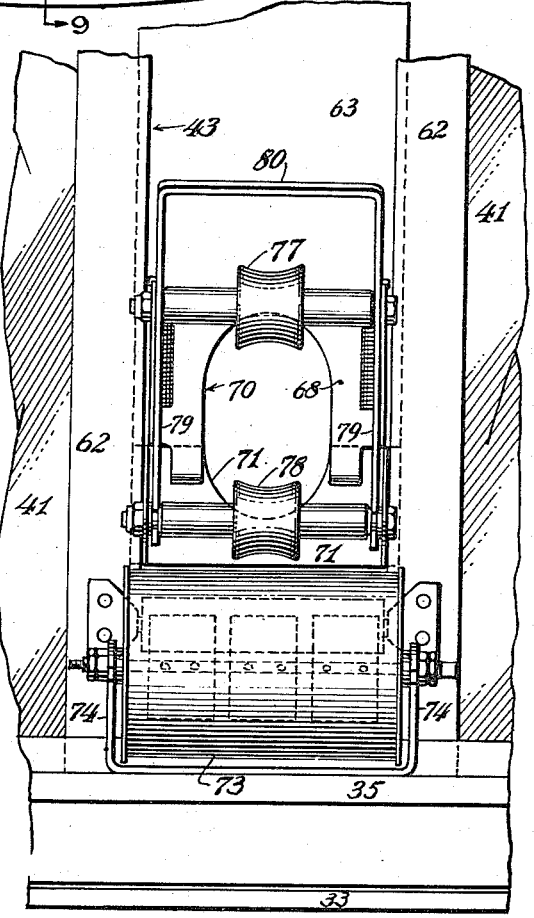

July 2, 1940.　　　C. G. TRIMBACH ET AL　　　2,206,065
FLEXIBLE GUN TURRET
Filed Nov. 3, 1937　　　7 Sheets-Sheet 5
Fig. 11.
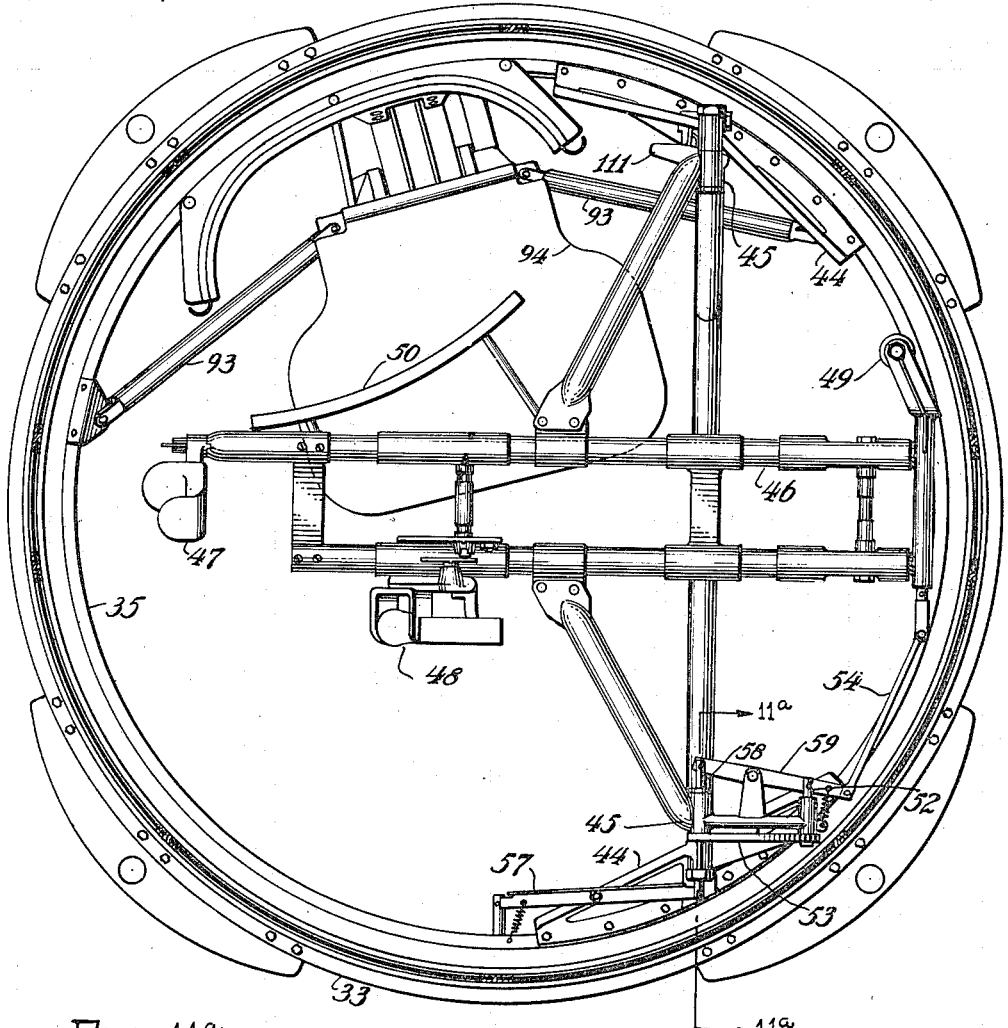
Fig. 11ª.
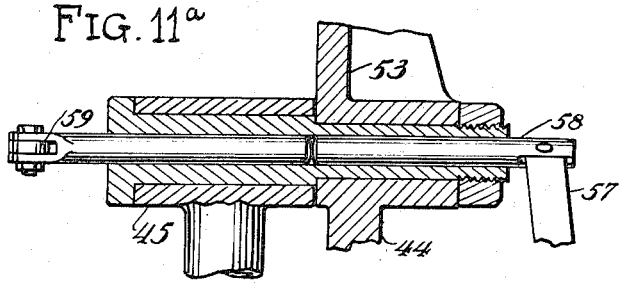
INVENTORS
CLEM G. TRIMBACH and
BY CAMILLE R. LEMONIER
ATTORNEY

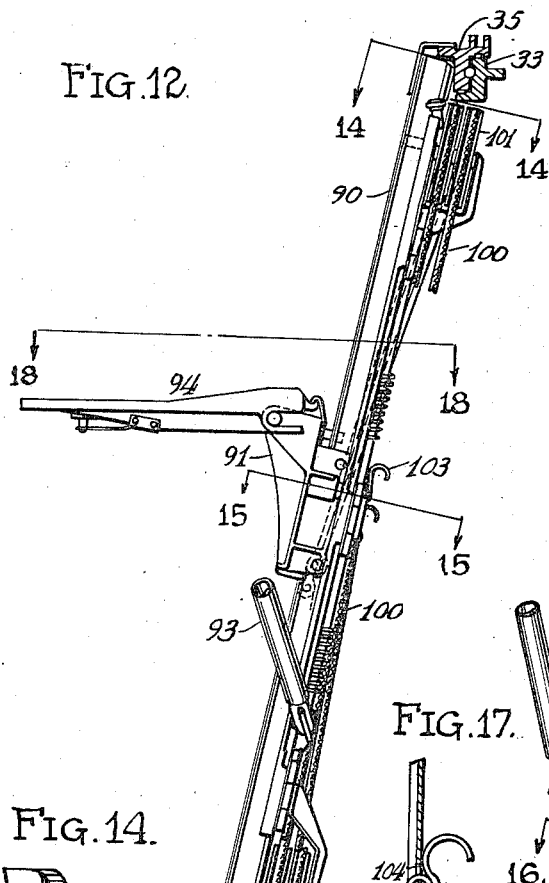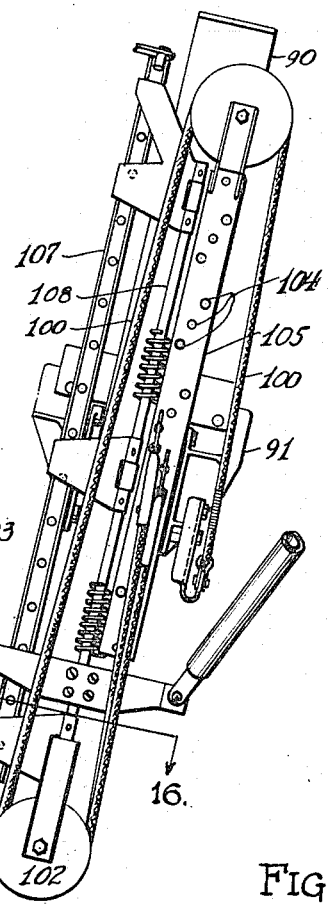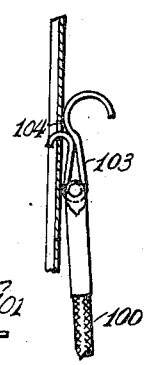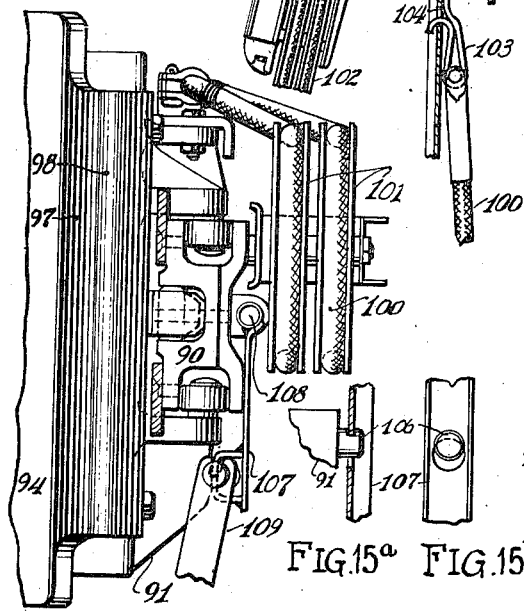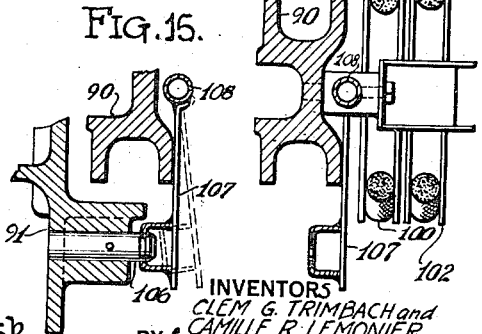

July 2, 1940.  C. G. TRIMBACH ET AL  2,206,065
FLEXIBLE GUN TURRET
Filed Nov. 3, 1937   7 Sheets-Sheet 7

INVENTORS
CLEM G. TRIMBACH and
CAMILLE R. LEMONIER
BY
ATTORNEY

Patented July 2, 1940

2,206,065

UNITED STATES PATENT OFFICE 2,206,065

FLEXIBLE GUN TURRET

Clem G. Trimbach, Eggertsville, and Camille R. Lemonier, Kenmore, N. Y., assignors to Curtiss-Wright Corporation, a corporation of Delaware Application November 3, 1937, Serial No. 172,544

5 Claims. (Cl. 89—37.5)

This invention relates to flexible gun mounts, and particularly comprises improvements in turret gun mounts for large caliber machine guns, the gun mount having particular adaptability to aircraft.

The principal objects of the invention are to provide a flexible, seat type mount for large caliber machine guns; to provide a transparent canopy for the gunner and gun movable with the mount; to provide an independently adjustable gunner's seat movable with and with respect to the gun, and to provide control mechanisms for the gun mount by which the gunner has extremely facile control of both the mount and the gun in all positions of adjustment of either. The invention also comprises various detail structures which will hereinafter be more fully described, and the improvements in these detail structures also comprise parts and objects of the invention.

The details of the invention may be more readily understood by referring to the annexed specification, in connection with the drawings, in which:

Fig. 3 is a phantom elevation of the transparent turret, showing certain portions of the gun mount;

Fig. 4 is a fragmentary plan of the turret;

Fig. 5 is a section on the line 5—5 of Fig. 4;

Fig. 6 is a section on the line 6—6 of Fig. 5;

Fig. 7 is a section on the line 7—7 of Fig. 4;

Fig. 8 is an enlarged section on the line 8—8 of Fig. 3;

Fig. 9 is a section on the line 9—9 of Fig. 8;

Fig. 9a is a section on the line 9a—9a of Fig. 9;

Fig. 10 is an elevation of that part of the turret shown in Fig. 9;

Fig. 11 is a section on the line 11—11 of Fig. 3;

Fig. 11a is a section on the line 11a—11a of Fig. 11;

Fig. 12 is a side elevation of a seat and seat supporting mechanism;

Fig. 13 is a rearward elevation of a seat and its supporting mechanism;

Fig. 14 is a section on the line 14—14 of Fig. 12;

Fig. 15 is an enlarged fragmentary section on the line 15—15 of Fig. 12;

Figs. 15a and 15b are detailed side and rear elevations of the detail shown in Fig. 15;

Fig. 16 is a section on the line 16—16 of Fig. 13;

Fig. 17 is an enlarged detail, partly in section, of part of the structure of Fig. 12;

Figure 1:
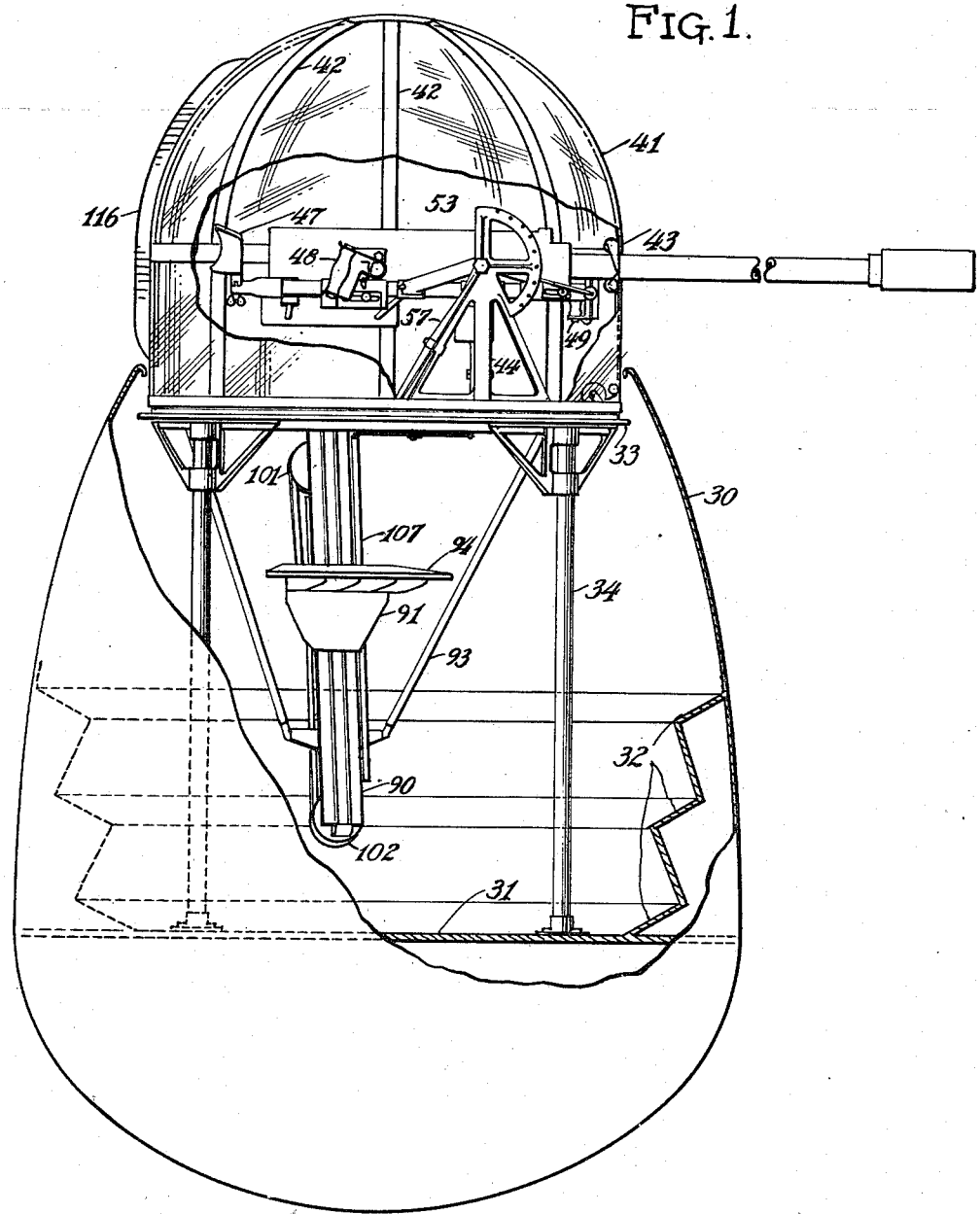
Fig. 1 is an elevation of the gun mount as adapted to an aircraft fuselage.
Figure 2:
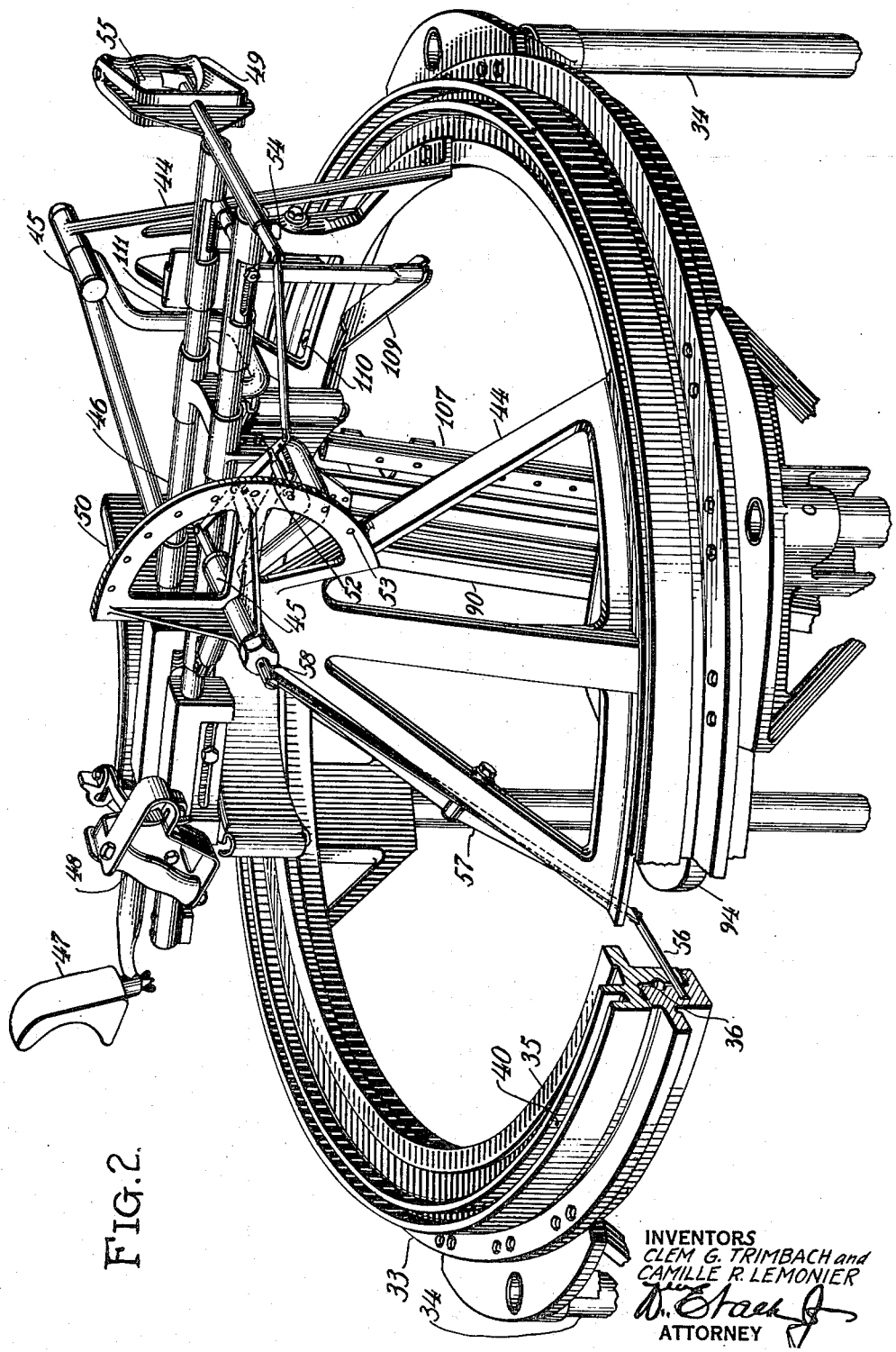
Fig. 2 is an enlarged perspective view of the upper part of the gun mount organization, partly in section, to show details.

The general organization of the gun mount is best shown in Figs. 1, 2, 3 and 11, Fig. 1 indicating an aircraft fuselage 30, provided with a floor 31 and annular gunner's steps 32 rising from the floor and encompassing a support ring 33 mounted on stanchions 34 rising from the floor 31. As shown in Fig. 2, the support ring 33 is formed more or less as a Z section, and a rotatable ring 35 is fitted thereto, the rings being provided with cooperating ball races 36 into which alternate balls and spacers 37 and 38 are introduced through a plugged opening 39 in the ring 35, as indicated in Fig. 9a. The balls 37 provide an anti-friction support for the ring 35 whereby the rings 33 and 35 are firmly locked together except for relative rotation.

A grooved flange 40, shown in Fig. 2, is formed in the top of the ring 35 to receive a transparent turret or canopy 41, the latter comprising cylindrical and spherical segments of transparent material joined at their edges by bands 42 and defining, along one vertical circumference, as shown in Fig. 4, an opening 43, the purpose of which will be apparent presently. Again referring to Fig. 2, it will be seen that trunnion brackets 44 rise from the ring 35 to carry alined trunnions 45 between which is supported a gun cradle 46. The cradle is organized for the mounting of a large caliber machine gun in such a way that the gun can reciprocate between spring cushions during recoil. The cradle is equipped with a shoulder stock 47, a right hand grip 48, and a left hand grip 49, along with a chest pad 50, whereby the gunner may assume a lateral position with respect to the gun and still have complete control thereof. The cradle may swing in elevation about the trunnions 45, and may be locked in any position of elevation through the medium of a pin 52 engaging openings in a sector 53 fixed to the bracket 44, said pin being selectively engageable with the sector through linkage 54 operated by a grip 55 cooperating with the handle 49. Said grip simultaneously controls the locking of the ring 35 in traverse. As shown in the lower part of Fig. 2, the ring 35 is provided with a slidable pin 56 which may move into and out of engagement with suitable holes drilled in the stationary support ring 36, the pin 56 being operated through a rock arm 57 pivoted to the bracket 44, said rock arm being actuated at its upper end by a split pin 58 passing through the trunnion, and being actuated through a rock arm 59 connected to the linkage 54. It is thus apparent that the gunner, by squeezing the grip 55, completely unlocks the cradle 46 to permit of gun movement either in elevation or traverse.

Reference may be made to Figs. 3 to 10, inclusive, which show details of the gun turret or canopy and the sliding gun barrel aperture embodied therein. Reference was previously made to the vertical circumferential opening 43 in the canopy, this opening being bordered by channel elements 62, within which an upper curtain 63 is slidable. The top part of the turret is provided with a gusset 64 with overlapping channel sections 62 therebeneath, the leftward channel section, shown in Fig. 5, embodying the fixed curtain 66 on the left side of the turret, as shown, while the leftward continuation of the lower channel element 62 provides a runway for the upper movable curtain 63, as the lowermost edge thereof is raised.

As shown in Figs. 8, 9 and 10, the curtain 63, at its lower end, is sandwiched between metal plates 68 and 69 having an aperture 70 for the projection of a gun barrel, the plates being spread apart at their lower ends to engage a plate 71, to which is attached a flexible curtain 72 wound upon a spring roller 73 fixed by a bracket 74 to the ring 35. The plates 68, 69 and 71 carry brackets 75 and 76, respectively, having rolls 77 and 78 joining opposed brackets for bearing upon a projecting gun barrel. The brackets 75 and 76 may be locked together by arms 79 joined by a handle 80, the arms being pivoted upon the axis of the roll 77 and engaging, through notches, the axis of the roll 78. If the gun muzzle be elevated, the curtains 63 and 72 will move therewith. If the gunner be desirous of either removing the gun or of operating the same independently of the curtains, he may release the latch 80, raising the curtain 63 and leaving the slot 43 open.

Figure 18:
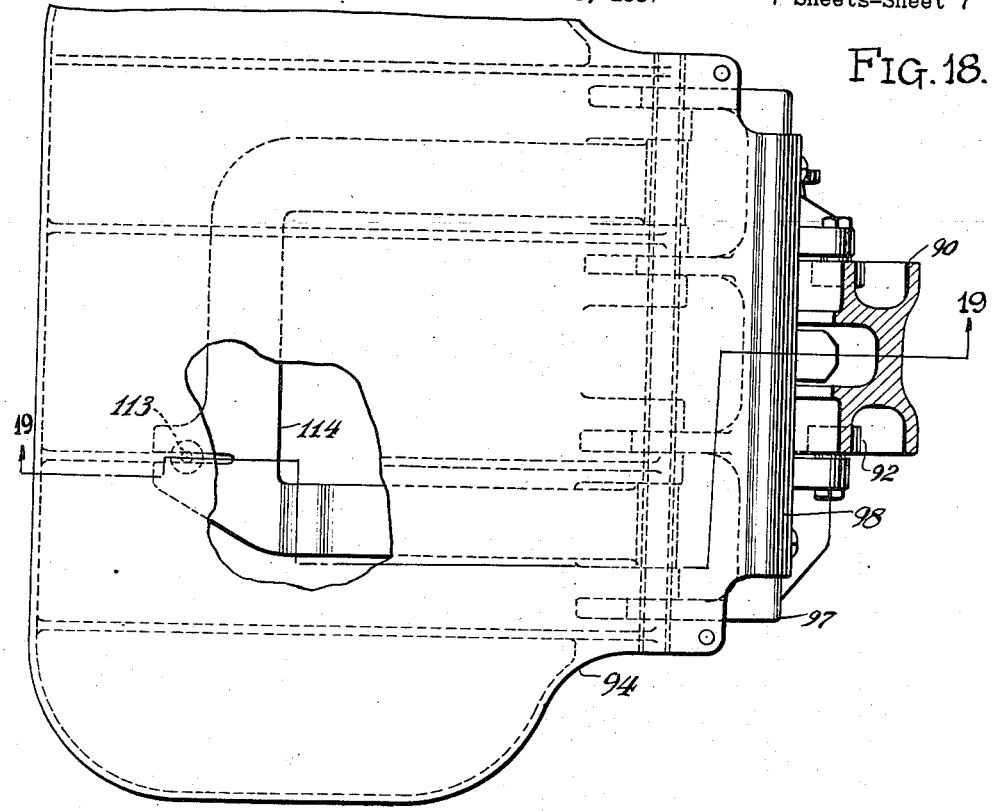
Fig. 18 is a section on the line 18—18 of Fig. 12, showing the seat in plan view.
Figure 19:
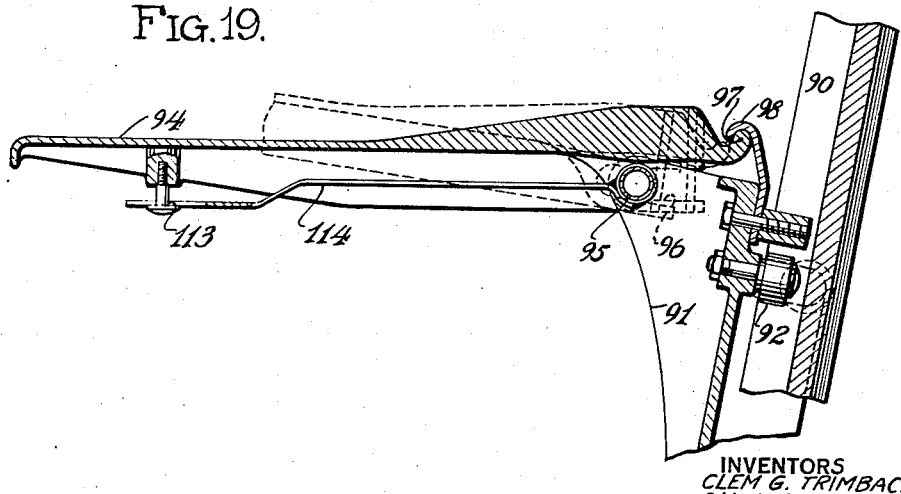
Fig. 19 is a section on the line 19—19 of Fig. 18.

Reference may now be made to Figs. 2, and 12 to 19, inclusive, in which are shown details of the gunner's seat which is movable both with and with respect to the rotatable ring 35. A seat rail 90 is fixed to the ring 35, depending therefrom, as shown in Fig. 12, and on this rail, which is grooved, is a seat bracket 91 provided with rollers 92 engaging the grooves of the track 90. Additional support is given to the rail 90 by brackets 93 extending upwardly and laterally to spaced apart points on the ring 35. A seat 94 is hinged to the bracket 91 at 95, through a slot connection 96, the rearward edge of the seat being formed as a dog 97 engageable with a channel 98 attached to the bracket 91. As indicated in Fig. 19, in full lines, the seat is locked in position for an occupant. The seat may be folded by raising its forward edge and shifting it away from the bracket 91, whereupon it may be either raised or dropped to an inactive position. To the bracket 91, a double flexible cord 100 is attached, this cord being reeved over pulleys 101 and 102 and terminating in hooks 103, as shown in Fig. 17. The hooks are engageable with any one of a plurality of holes 104 formed in a plate 105 bolted to the rail 90. By adjusting the hooks 103 in various holes, the tension on the shock cord may be varied in accordance with the weight of the gunner.

Means are provided for locking the seat to any desired height, such means comprising, as shown in Figs. 15 to 16, a slotted lug 106 carried by the bracket 91, engageable by a rail 107 pivoted on the axis 108 indicated in Figs. 13 and 14, said rail having a plurality of holes, any one of which may be engaged by the lug 106. Movement of the rail 107 about its pivot is controlled by an arm 109 (Figs. 2 and 14), said arm being pivoted at 110 to the ring 35, and being actuated by an arm pad 111 adjacent the left hand trunnion bracket 44. By the use of the slotted lug 106, the rail 107 cannot be disengaged from the lug when there is no weight on the seat, since the shock cord pulls the seat upwardly, engaging the rail with the lug. This prevents inadvertent snapping of the seat, with possible damage to the mechanism or harm to the occupant. As soon as the occupant sits on the seat and bears down, the shock cord is stretched and the lug may be disengaged from the rail 107 for further adjustment of the height of the seat.

Fig. 18 shows an extra pin and slot connection 113, cooperating with a U-shaped brace 114 mounted on the hinge rod 95, by which rectangular fore and aft motion of the seat is assured when it is raised to effect disengagement of the elements 97 and 98. Otherwise, the slot 96 might permit of lateral tipping of the seat with respect to the hinge rod to prevent full engagement or disengagement of the elements 97 and 98.

Although they have not been specifically named in the drawings, various springs are provided in connection with the controls of the gun elevating and traversing locks and the seat elevation lock, the application of these springs to the mechanisms involved being obvious to those skilled in the art.

Although the mechanism, from the above description, might appear to be somewhat complicated, actually, when it is fully understood, it becomes quite simple while combining numerous excellent features for facilitating flexible gun fire from a turret type of gun mount. In use, the seat may be raised or lowered in accordance with the elevation of gun fire desired or, the seat may be quickly unlocked and the gunner may operate the gun from a standing position. In either case, whether he be seated or standing, the turret by virtue of its ball bearing mounting, may be quickly turned for gun traverse and when seated, the annular steps 32 allow for full and quick control of the gunner's movements in training the gun. The simultaneous locking of the gun in elevation and azimuth is desirable since, in action, simultaneous movement in elevation and azimuth of the gun is necessary when firing.

A further feature of the gun mount of this invention resides in the perfect aerodynamic balance afforded thereby, since the turret 41 is symmetrical about its rotational axis, and windage, even in high speed aircraft, will not impose any turning tendency thereon. Incidental to the projection of a gun barrel through the turret, as shown in Fig. 1, the diametrically opposite part of the turret may be provided with a drag vane 116 which will afford rotational stability for the gun mount regardless of the direction in which the gun may be pointed from the aircraft, and regardless of the speed of flight. It has been found in practice that the conventional flexible gun mounts of the past have been found inadequate in present high speed aircraft, due to the terrific air reactions on exposed parts of the mount by which the gunner is prevented from accurately training the gun and holding an aimed position. Since the use of a flexible gun mount in aircraft is mandatory from a military standpoint in certain types of craft, the present invention provides for full flexibility, and by its organization, will enable a gunner to maintain an accuracy of fire even better than that which was obtainable in the older type gun mounts used on low speed aircraft.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In an aircraft seat organization, a substantially vertical track, a carrier movable therealong, a seat on said carrier, means resiliently urging said carrier upwardly along the track, a stud on the carrier, and a swingable locking bar having a plurality of spaced openings within any one of which said stud is engageable for locking the carrier against movement along the track, said stud having a recess engageable by said bar to prevent inadvertent disengaging swinging of said locking bar unless the tension of said resilient means is balanced.

2. In a flexible gun mount assembly in combination, a rotatable ring, gun trunnions thereon the axis of said trunnions being above and inboard of the ring edge, a gun support mounted on the trunnions extending across more than half the ring diameter, a seat carried by the ring and disposed below and to one side of the gun support, a gun aiming handle on the seat side of said support toward the forward end thereof, an arm stock at the rear of said support, and a gun aiming handle on the anti-seat side of said support toward the rearward end thereof, said seat and support being thus disposed to allow of seating of a gunner at the side of the gun support while allowing of free manipulation of the gun support in elevation and traverse.

3. In a flexible gun mount assembly in combination, a rotatable ring, gun trunnions thereon the axis of said trunnions being above and inboard of the ring edge, a gun support mounted on the trunnions extending across more than half the ring diameter, a seat carried by the ring and disposed below and to one side of the gun support, a gun aiming handle on the seat side of said support toward the forward end thereof, an arm stock at the rear of said support, a gun aiming handle on the anti-seat side of said support toward the rearward end thereof, said seat and support being thus disposed to allow of seating of a gunner at the side of the gun support while allowing of free manipulation of the gun support, means for locking said ring against rotation and said support against elevation or depression on the trunnions, and a coincidental operator for said locking means comprising an auxiliary grip adjacent said first mentioned gun support handle.

4. In a flexible gun mount assembly in combination, a rotatable ring, gun trunnions thereon the axis of said trunnions being above and inboard of the ring edge, a gun support mounted on the trunnions extending across more than half the ring diameter, a seat carried by the ring and disposed below and to one side of the gun support, a gun aiming handle on the seat side of said support toward the forward end thereof, an arm stock at the rear of said support, a gun aiming handle on the anti-seat side of said support toward the rearward end thereof, said seat and support being thus disposed to allow of seating of a gunner at the side of the gun support while allowing of free manipulation of the gun support, means for locking said ring against rotation and said support against elevation or depression on the trunnions, a coincidental operator for said locking means comprising an auxiliary grip adjacent said first mentioned gun support handle, and a gun trigger adjacent said other handle.

5. In a flexible gun mount assembly in combination, a support structure including an annulus, a ring rotatably mounted in said annulus, gun supporting brackets on the ring extending above and inboard of the ring edge, a gun carrier mounted on said brackets for vertical swinging, an aiming grip on each side of the carrier, a breast pad on one side thereof, a seat suspended from the ring at the same side of the carrier as the pad for accommodating a gunner, the seat being located to position the gunner for bearing upon said breast pad and for grasping said carrier grips, means for elevating and lowering said seat, and a cockpit embracing the gun mount comprising superposed annular footrests upon which the gunner may place his feet for rotating the gun mount and for elevating and lowering the seat.

CLEM G. TRIMBACH.
CAMILLE R. LEMONIER.